Figure 1:
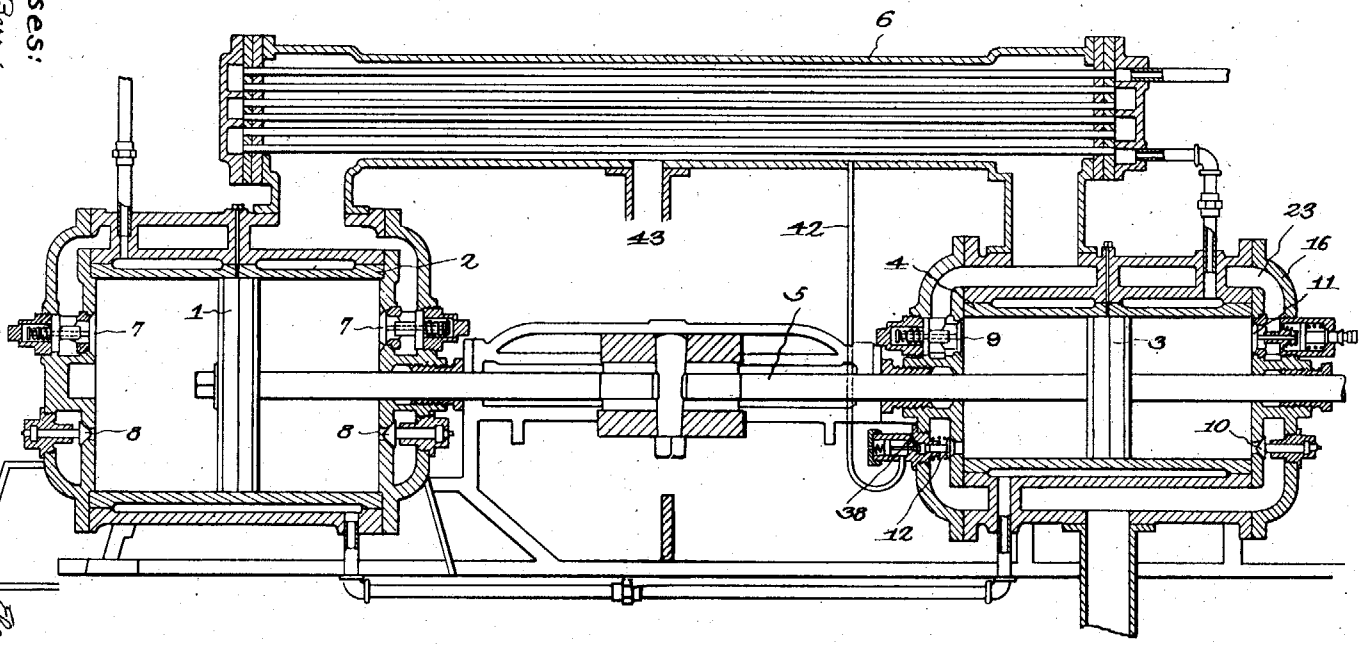

No. 12,599. REISSUED JAN. 22, 1907.

E. HILL.

AIR COMPRESSOR.

APPLICATION FILED MAY 15, 1906

4 SHEETS—SHEET 1.

Witnesses:
Lena C. Berry.
S. S. Grotta

Inventor:
Ebenezer Hill
by
Harry R. Williams
Attorney

THE NORRIS PETERS CO., WASHINGTON, D. C.

No. 12,599. REISSUED JAN. 22, 1907.
E. HILL.
AIR COMPRESSOR.
APPLICATION FILED MAY 15, 1906.
4 SHEETS—SHEET 2.
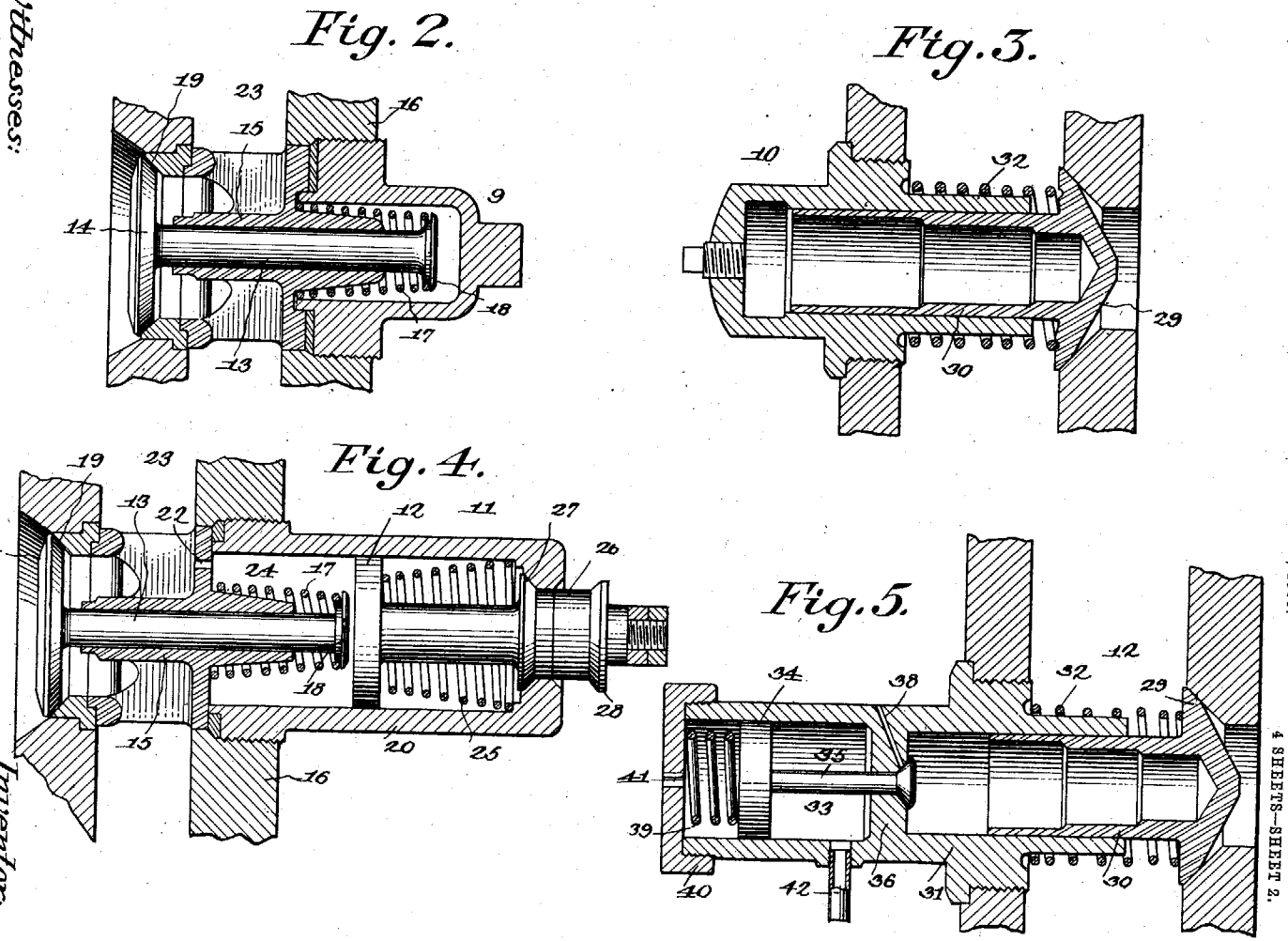
Witnesses:
Lena E. Berry
S. S. Grotta.
Inventor:
Ebenezer Hill by
Harry P. Williams
Attorney
THE NORRIS PETERS CO., WASHINGTON, D. C.

No. 12,599. REISSUED JAN. 22, 1907.
E. HILL.
AIR COMPRESSOR.
APPLICATION FILED MAY 15, 1906.
4 SHEETS—SHEET 3.
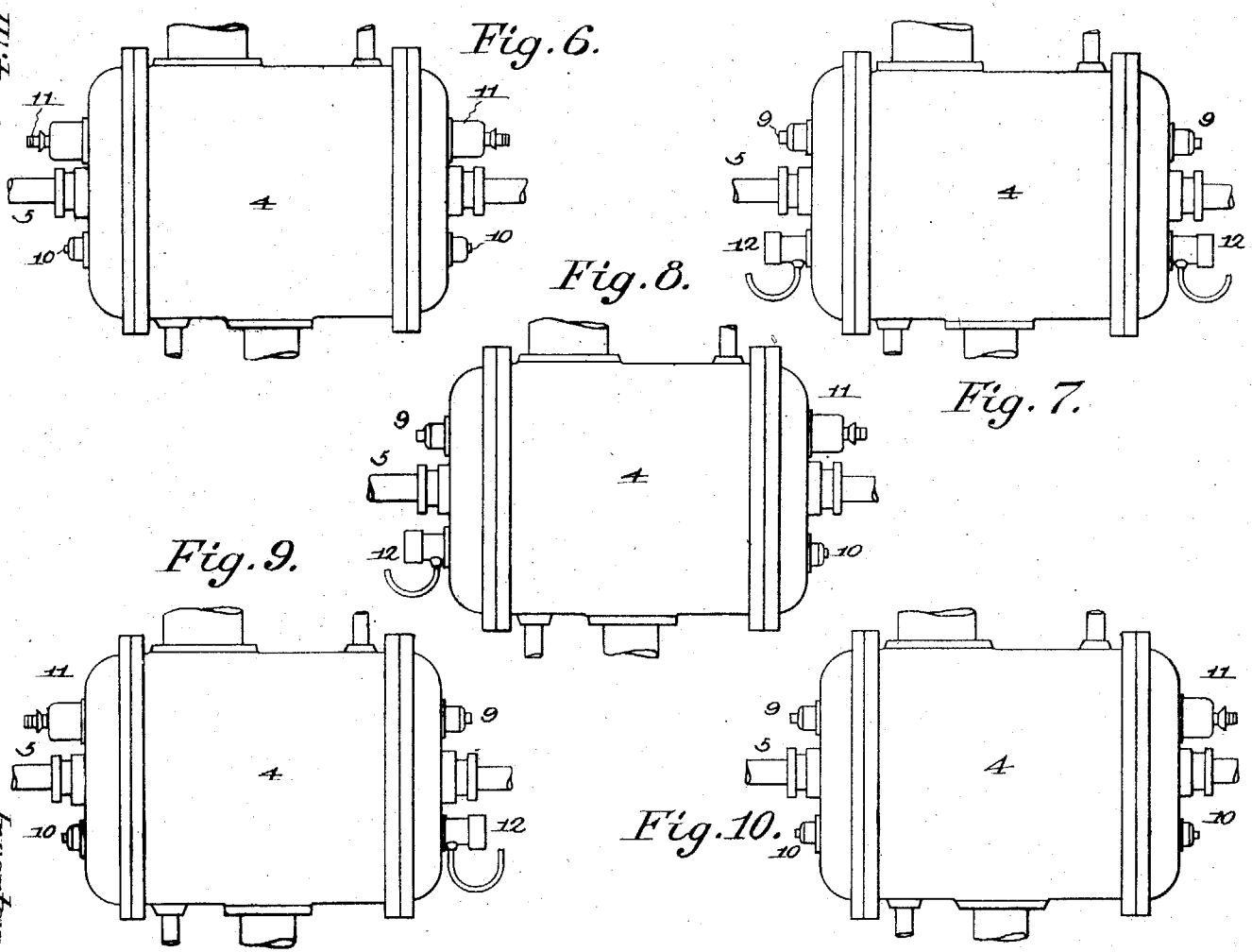
Witnesses:
Lesia C. Berry.
S. S. Grotta
Inventor:
Ebenezer Hill by
Harry R. Williams
Attorney
THE NORRIS PETERS CO., WASHINGTON, D. C.

No. 12,599. REISSUED JAN. 22, 1907.

E. HILL.

AIR COMPRESSOR.

APPLICATION FILED MAY 15, 1906.

4 SHEETS—SHEET 4.

Witnesses:
Lena C. Berry.
S. S. Grotta.

Inventor:
Ebenezer Hill,
by Harry P. Williams
Attorney

THE NORRIS PETERS CO., WASHINGTON, D. C.

UNITED STATES PATENT OFFICE.

EBENEZER HILL, OF SOUTH NORWALK, CONNECTICUT.

AIR-COMPRESSOR.

No. 12,599. Specification of Reissued Letters Patent. Reissued Jan. 22, 1907.

Original No. 700,927, dated May 27, 1902. Application for reissue filed May 15, 1906. Serial No. 317,004.

*To all whom it may concern:*

Be it known that I, EBENEZER HILL, a citizen of the United States, residing at South Norwalk, in the county of Fairfield and State of Connecticut, have invented certain new and useful Improvements in Air-Compressors, of which the following is a specification.

It is frequently necessary in factories to use compressed air at two different pressures. For example, it may be desired to draw air at twenty pounds for cleaning castings and at the same time draw air at ninety pounds for running hoists and tools. Under ordinary conditions drawing air from between the cylinders of a compound compressor reduces the volume of air to such an extent that the interpressure will not be maintained.

This invention relates to a compound compressor so devised that air may be drawn at two different pressures without material reduction of pressure in the interreservoir.

The object is to so arrange the valves and connections of a compressor that when air is drawn at low pressure from between the cylinders the second piston will automatically be rendered partly or wholly inoperative, thus leaving sufficient air between the cylinders to maintain the pressure.

This invention resides in a compound air-compressor having a passage connecting the interreservoir or other part of the duct between the cylinders and a specially-constructed inlet or discharge valve of the second cylinder, whereby on a reduction of pressure between the cylinders this special valve will be held open, so that the action of the second piston will be rendered ineffective and the volume of air which otherwise would be pumped forward by said piston will be reserved to prevent a reduction of volume and a consequent fall of pressure which would otherwise be incident to the low-pressure demand.

Figure 12:
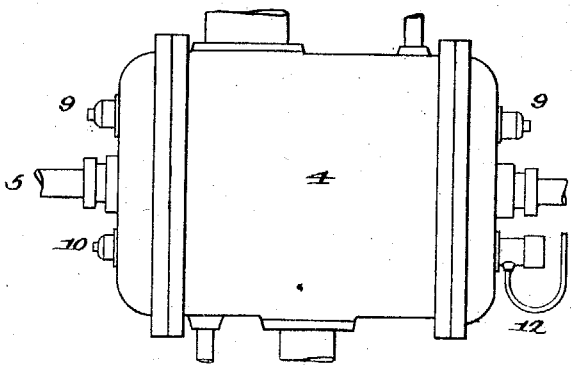
Figure 14:
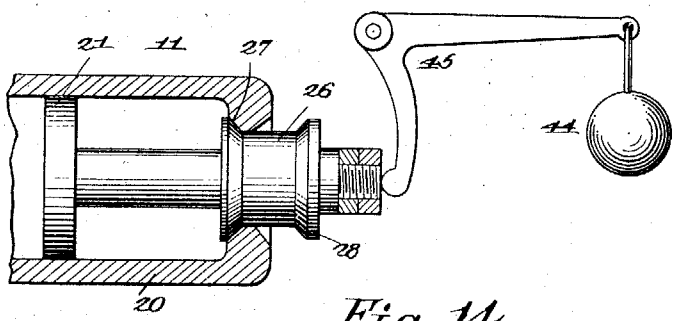
Figure 11:
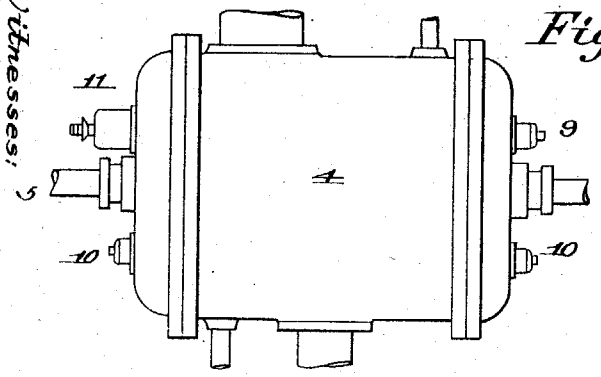
Figure 13:
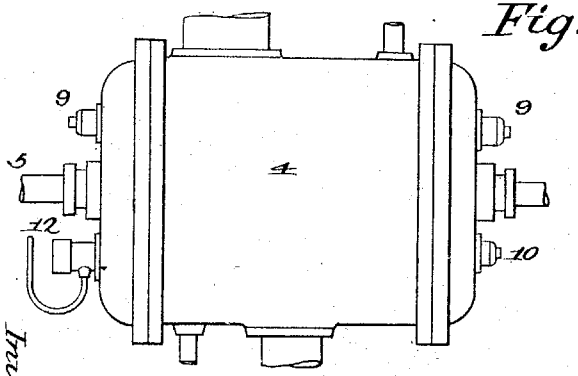

Figure 1 of the accompanying drawings shows an elevation of a part of a compound air-compressor with the first and second cylinders in section. Fig. 2 shows a section of an ordinary inlet-valve. Fig. 3 shows a section of an ordinary discharge-valve. Fig. 4 shows a section of a special inlet-valve. Fig. 5 shows a section of a special discharge-valve. Fig. 6 is a diagram indicating the manner of using the special inlet-valve at each end to put the second cylinder entirely out of commission. Fig. 7 is a diagram indicating the use of a special discharge-valve at each end to put the second cylinder entirely out of commission. Fig. 8 is a diagram indicating the use of a special inlet-valve at one end and a special discharge-valve at the other end for putting the second cylinder out of commission. Fig. 9 is a diagram indicating the use of a special inlet-valve and a special discharge-valve at the ends of the second cylinder opposite to the arrangement represented by Fig. 8. Fig. 10 is a diagram indicating the use of a special inlet-valve at one end for putting one half of the cylinder out of commission. Fig. 11 is a diagram indicating the use of a special inlet-valve for putting the other half of the second cylinder out of commission. Fig. 12 is a diagram indicating the use of a special discharge-valve at one end for putting that end of the cylinder out of commission. Fig. 13 is a diagram indicating the use of a special discharge-valve for putting the opposite half of the cylinder out of commission, and Fig. 14 is a view showing a modified means for operating a discharge-valve when the pressure in the cylinder-interduct is reduced.

The piston 1 in the double-acting first cylinder 2 of the compressor illustrated is connected with the piston 3 in the double-acting cylinder 4 by a rod 5, which is adapted to be connected with steam-pistons in the usual manner. The first and second cylinders are connected by an ordinary interreservoir 6, which may be any desired shape and diameter and which, with the openings to the valve-ports, forms the interduct. The first cylinder at each end has a common inlet-valve 7 and a common discharge-valve 8. The second cylinder is shown with a common inlet-valve 9 at one end and a common discharge-valve 10 at the other end. If the inlet-valve at one end of the second cylinder is held open, that end of the cylinder will be inoperative. Holding the discharge-valve at one end of the second cylinder open will accomplish the same result. The second cylinder is illustrated with a special inlet-valve 11 that will be held open when air is drawn from the interduct, and it is also illustrated with a special discharge-valve 12, that will be held open when air is drawn from the interduct. If both valves are held open, the cylinder will be rendered wholly inoperative. In practice but one special valve is used at a time, so that but half of the cylinder will be rendered inoperative.

The stem 13 of the disk 14 of the special inlet-valve 11 is supported by a guide 15, fastened in the cylinder-head 16. A spring 17 is arranged between a part of the guide and a head 18 on the end of the stem for closing the disk to its seat 19. When the head 18 is unobstructed, the disk 14 opens and closes normally, Fig. 4. A plug 20 with a cylindrical bore is screwed into the cylinder-head, and loosely fitting in this is a piston 21. An opening 22 is made from the interduct 23 into the chamber 24 in this plug. Between the piston and the end of the plug is a stiff spring 25, so placed that it tends to force the piston toward the head of the disk-stem, Fig. 4. The shank of the piston has a cylindrical section 26, that fits the walls of the outer end of the plug. At the inner end of the cylindrical section of the shank is a beveled flange 27, that is adapted to seat against the inside of the end of the plug, and at the outer end of the cylindrical section of the shank is a beveled flange 28, that is adapted to set against the outside of the end of the plug. The flanges and inner and outer walls of the end of the plug are so shaped that when the flanges are seated tight joints will be made, Fig. 4. When the pressure in the interduct is normal, that pressure is exerted in the chamber 24 and forces the piston against its spring away from the head of the disk and causes the inner flange to seat against the inner end of the plug. With the piston held in this position by the pressure the inlet-valve can operate in the ordinary manner. If the piston 21 should leak, its function will be performed by the cylindrical section 26 and flange 27 of its shank. Should the pressure in the interduct become momentarily reduced by the withdrawal of air from the interreservoir or other part of the duct between the cylinders, the reduction of pressure in the chamber 24 allows the spring to force the piston into engagement with the head of the disk-stem and hold the valve open. When the valve is held open, this end of the cylinder is inoperative, the air merely pulsating in and out through the port as the piston reciprocates without effect. As long as the pressure is below normal this end of the cylinder is reserved to supply the air demanded by reason of the withdrawal of air at low pressure from the interduct. When the piston is thrust forwardly by its spring, the outer flange on the piston-shank seats against the end of the plug and seals the opening. After the pressure is again restored by ceasing to withdraw air from the interduct the piston is forced back, so that the inlet-valve can operate normally.

The disk 29 of the discharge-valve 12 is attached to a cylindrical shank 30, which loosely fits the cylindrical opening in the plug 31, that is screwed into the cylinder-head. The disk is pressed against its seat by a spring 32, that is located between the back of the disk and a shoulder on the plug. Under ordinary conditions this disk opens and closes with the strokes of the piston for passing air from the cylinder to the discharge-outlet. If this disk is held open, air will freely pulsate into and out of the end of the cylinder, and that side of the piston will do no work, Fig. 5. In a chamber 33 in this plug is a piston 34, with a stem 35, that extends through an opening in a transverse wall 36, and on the other side has a head 37. The piston-stem loosely fits the opening through the transverse wall, and the head is beveled to fit the beveled end of the opening through the wall. A passage 38 is made from the opening through the wall to the outer atmosphere, Fig. 5. A coiled spring 39 between the piston and the cap 40 on the end of the plug tends to press the piston forward and move the head of the stem away from the opening through the wall. An opening 41 is made through the cap, so that there will be no air-pressure back of the piston. A passage 42 connects the interreservoir with the chamber in the plug between the transverse wall and the piston, Fig. 5. If the pressure in the interduct is normal, the piston is forced backward against its spring, so that the head of the stem will close the passage from the opening through the transverse wall of the plug to the outer air. With the parts in this state the disk will open and close, as usual. When the pressure in the interduct drops, as when air is drawn from the interreservoir through the discharge-pipe 43, the spring 39 pushes the piston forwardly, so the passage through the wall of the plug to the outer air will be unsealed. With this passage open the air in the disk-shank-guiding chamber of the plug is discharged. Then the disk will be forced open and held open as long as the passage 38 is open by the air-pressure on its face. As the pressure in the interduct is restored pressure will accumulate in the chamber 33 in the plug and force the piston 34 against its spring 39, so that the head 37 will be drawn to its seat and close the passage to the outer air. When the passage 38 to the outer air is closed, the pressure, by leakage around the cylindrical shank of the disk, which, as stated, loosely fits the cylindrical opening in the plug, will then accumulate in the plug between the transverse wall 36 and the back of the disk, and the disk will resume its normal operation, for then the air-pressure will be substantially equal on both faces of the disk, so that the spring may perform its function.

The action of the inlet-valve differs from that of the discharge-valve in that the auxiliary force which opens the disk of the former and puts an end of the cylinder out of commission is a spring, while the auxiliary means for holding open the disk of the latter and putting an end of the cylinder out of commission is the pressure of air. It is possible to employ gravity, as by means of a weight 44 and lever 45, instead of a spring or air-pressure for this auxiliary force, as represented by dotted outline in Fig. 14. These valves act automatically, and when one is held open the amount of air that would have passed through it and not return is reserved to supply the place of that which is drawn off from the interduct.

If it is desired to render the second cylinder entirely inoperative, one of the above special inlet-valves could be used at each end, as indicated by Fig. 6, or one of the above-described discharge-valves could be used at each end, as indicated by Fig. 7, or a special inlet-valve could be used at one end and a special discharge-valve could be used at the other end of the second cylinder, as indicated by Figs. 8 and 9. If it is desired to put only one half of the second cylinder out of commission, one special inlet or one special discharge-valve can be used at either end, as indicated by Figs. 10, 11, 12, and 13.

By means of the simple mechanism described it is possible to furnish air at high and low pressures with a single compressor, so as to meet the ordinary demands of a factory.

I claim as my invention—

1. A compound air-compressor having cylinders, pistons, inlet and discharge valves and cylinder-interduct, means for opening a valve of the second cylinder, and a passage so connecting said interduct with the valve-opening means that the pressure in the cylinder-interduct controls the operation of the valve-opening means, substantially as specified.

2. A compound air-compressor having cylinders, pistons, inlet and discharge valves and cylinder-interduct, means tending to open an inlet-valve of the second cylinder, a passage so connecting said interduct with the chamber of said inlet-valve that the normal pressure in the cylinder-interduct is exerted oppositely to and holds in check the means tending to open said inlet-valve, substantially as specified.

3. In a compound air-compressor having cylinders, pistons, inlet and discharge valves and cylinder-interduct, a valve-piston, means for moving the valve-piston, so it will open a valve of the second cylinder, and a passage so connecting said interduct with the valve-piston chamber that the normal pressure in the cylinder-interduct is exerted oppositely to and holds the means for moving the valve-piston, substantially as specified.

4. A compound air-compressor having cylinders, pistons, inlet and discharge valves and cylinder-interduct, a valve-piston, a spring for moving the valve-piston so it will open a valve of the second cylinder, and a passage so connecting said interduct with the valve-piston chamber that the normal pressure in the cylinder-interduct is exerted oppositely to and holds the means for moving the valve-piston, substantially as specified.

5. A compound air-compressor having cylinders, pistons, inlet and discharge valves and cylinder-interduct, a valve-piston, a spring for moving the valve-piston into contact with a portion of a valve of the second cylinder, and a passage so connecting said interduct with the valve-piston chamber that the normal pressure in the cylinder-interduct is exerted oppositely to and overcomes the spring, substantially as specified.

6. In an air-compressor, apparatus for effecting an initial compression, an interduct for containing the initially-compressed air, apparatus supplied by the interduct for effecting a further compression of the initially-compressed air, and means for regulating the effective action of the apparatus for effecting the further compression actuated by the variations in pressure in the interduct.

7. A compound air-compressor for supplying air at two different but practically constant pressures, having means actuated by the pressure between the cylinders for controlling the effective action of the high-pressure piston.

8. An apparatus for compressing air having means in which an initial compression is effected, means for subsequently further compressing air initially compressed, and means for regulating the action of the means for effecting the further compression by the variation in pressure of the air which has been initially compressed.

EBENEZER HILL.

Witnesses:
J. E. SLATER,
E. HILL, Jr.